(12) United States Patent
Raines et al.

(10) Patent No.: US 11,535,188 B1
(45) Date of Patent: Dec. 27, 2022

(54) AIRBAG WITH INTEGRATED AIR DUCT

(71) Applicant: Ford Global Technologies, LLC, Dearborn, MI (US)

(72) Inventors: Stacey H. Raines, Ypsilanti, MI (US); Russell Joseph Mihm, Beverly Hills, MI (US); Fernando Ovando, Toluca (MX); Alan Perelli, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/462,785

(22) Filed: Aug. 31, 2021

(51) Int. Cl.
*B60R 21/205* (2011.01)
*B60R 21/261* (2011.01)
*B60R 21/217* (2011.01)
*B60R 21/2342* (2011.01)

(52) U.S. Cl.
CPC .......... *B60R 21/261* (2013.01); *B60R 21/205* (2013.01); *B60R 21/217* (2013.01); *B60R 21/2342* (2013.01); *B60R 2021/2612* (2013.01)

(58) Field of Classification Search
CPC .......... B60R 21/276; B60R 2021/2612; B60R 2021/2765
See application file for complete search history.

(56) References Cited

U.S. PATENT DOCUMENTS

| | | | | |
|---|---|---|---|---|
| 5,085,465 A * | 2/1992 | Hieahim | ................ | B60R 21/30 280/738 |
| 5,257,818 A * | 11/1993 | Steffens, Jr. | ............ | B60R 21/26 280/736 |
| 5,580,122 A * | 12/1996 | Muehlhausen | ...... | B62D 25/081 296/192 |
| 6,273,495 B1 * | 8/2001 | Haba | .................... | B60H 1/0055 296/70 |
| 6,378,934 B1 * | 4/2002 | Palazzolo | ............ | B62D 25/145 296/70 |
| 6,464,280 B1 * | 10/2002 | Shibata | ................ | B62D 25/142 296/70 |
| 6,582,011 B2 * | 6/2003 | Palazzolo | .............. | B60H 1/242 296/70 |
| 6,601,902 B1 * | 8/2003 | Rahmstorf | ......... | B60H 1/00028 296/70 |
| 6,912,863 B2 * | 7/2005 | Tanaka | ............... | B60H 1/00514 296/70 |
| 7,325,827 B2 * | 2/2008 | Reiter | ................... | B60R 21/215 280/732 |
| 7,731,261 B2 * | 6/2010 | Wenzel | ................ | B62D 29/004 296/70 |
| 9,085,096 B2 | 7/2015 | Wenzel et al. | | |

(Continued)

FOREIGN PATENT DOCUMENTS

DE 19626441 A1 * 1/1998 ......... B60H 1/00028
DE 102013021200 A1 7/2014

*Primary Examiner* — Barry Gooden, Jr.
(74) *Attorney, Agent, or Firm* — Vichit Chea; Price Heneveld LLP

(57) ABSTRACT

An airbag assembly for a vehicle is provided that includes a housing coupled to the support structure of a vehicle. An airbag module is coupled to and supported by the housing. The airbag module includes an airbag deployable from an undeployed condition to a deployed condition, and an inflator configured to inflate the airbag from the undeployed condition to the deployed condition. An air duct that is configured to transmit an airflow is at least partially integrally coupled to the housing.

18 Claims, 6 Drawing Sheets

(56) References Cited

U.S. PATENT DOCUMENTS

| | | | |
|---|---|---|---|
| 9,409,538 B2 | 8/2016 | Gorman et al. | |
| 10,040,414 B1* | 8/2018 | Stevens | B60R 21/2165 |
| 10,076,958 B1* | 9/2018 | Raines | B60H 1/00564 |
| 2003/0001366 A1* | 1/2003 | Debler | B60H 1/00564 |
| | | | 280/732 |
| 2003/0227195 A1* | 12/2003 | Charbonnel | B62D 29/001 |
| | | | 296/70 |
| 2004/0094939 A1 | 5/2004 | Debler et al. | |
| 2004/0135400 A1* | 7/2004 | Matsuzaki | B62D 29/04 |
| | | | 296/193.02 |
| 2005/0121890 A1 | 6/2005 | Kong | |
| 2006/0261581 A1* | 11/2006 | Kansteiner | B60R 21/205 |
| | | | 280/740 |
| 2015/0145235 A1* | 5/2015 | Gorman | B60R 21/205 |
| | | | 280/732 |
| 2015/0183390 A1* | 7/2015 | Gorman | B60H 1/00271 |
| | | | 280/728.2 |
| 2018/0126940 A1* | 5/2018 | Greer, Jr. | B60R 21/206 |

* cited by examiner

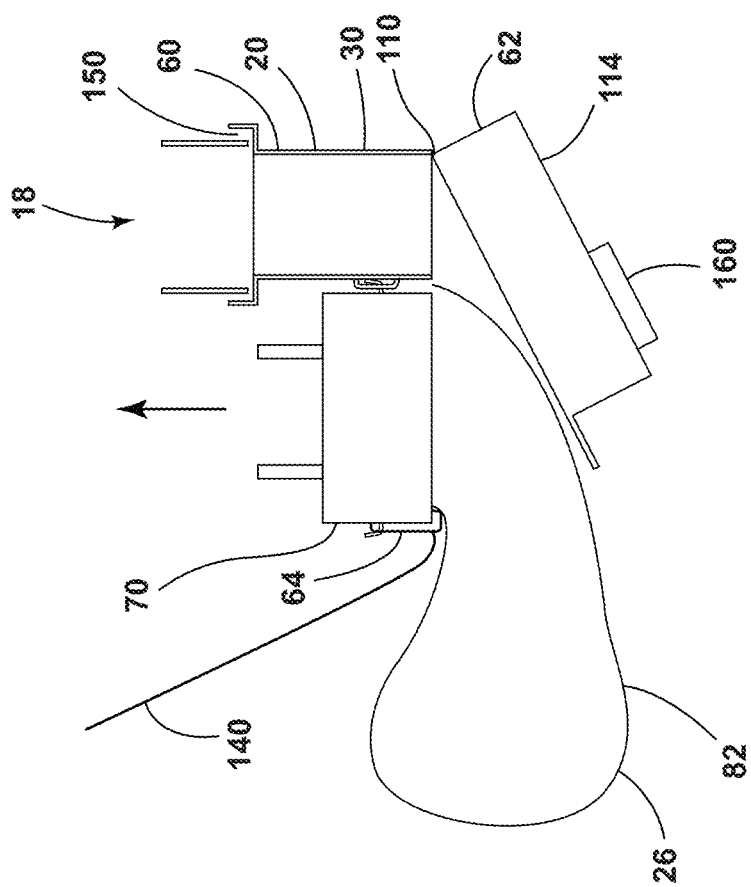
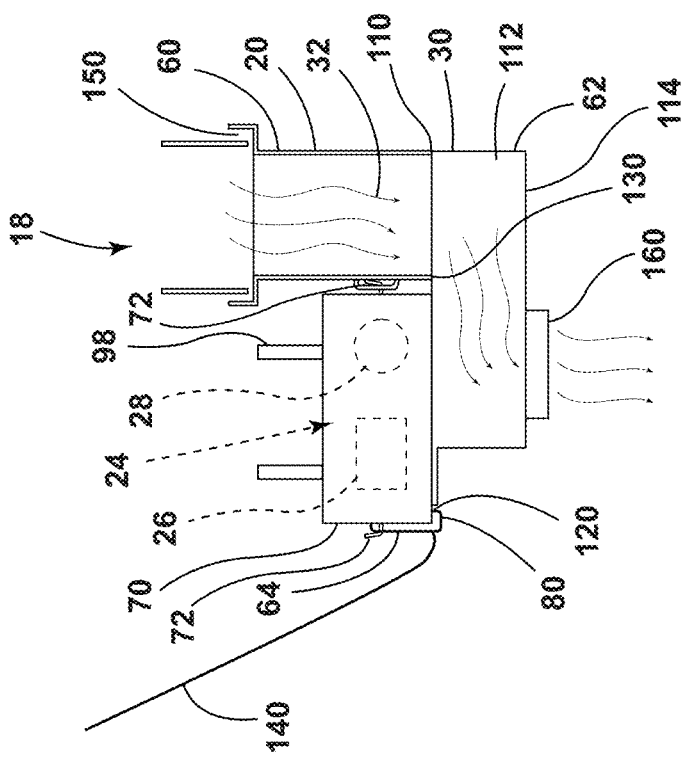
FIG. 5A
FIG. 5B

AIRBAG WITH INTEGRATED AIR DUCT

FIELD OF THE DISCLOSURE

The present disclosure generally relates to an integrated air duct for a vehicle having an airbag.

BACKGROUND OF THE DISCLOSURE

Passenger airbags and air ducts are commonly employed on motor vehicles. Passenger airbags are typically located near a passenger seat in a vehicle passenger compartment. Further, air ducts are also often located near a passenger seat in a vehicle passenger compartment. The passenger airbags and air ducts are often located in the same general space in the passenger compartment. It would be desirable to provide for an arrangement of devices that makes more efficient use of the space.

SUMMARY OF THE DISCLOSURE

According to a first aspect of the present disclosure, an airbag assembly of a vehicle includes a support structure of the vehicle, a housing coupled to the support structure, an airbag module coupled to and supported by the housing, and an air duct at least partially integrally coupled to the housing. The airbag module further includes an airbag deployable from an undeployed condition to a deployed condition, and an inflator configured to inflate the airbag from the undeployed condition to the deployed condition. Further, the air duct is configured to transmit an airflow.

Embodiments of the first aspect of the disclosure can include any one or a combination of the following features:
- the support structure is within or proximate to at least a portion of a dashboard of the vehicle;
- the air duct further includes an air duct first portion integrally coupled to the housing, and an air duct second portion coupled to the air duct first portion;
- an airbag cover vehicle-rearward of the housing, wherein the airbag cover has a vehicle-rearward section and a tear seam disposed on the vehicle-rearward section, and wherein the vehicle-rearward section and the tear seam define an airbag cover opening configured to direct a deployment of the airbag as the inflator inflates the airbag;
- the housing includes a bottom portion and a vehicle-rearward portion adjacent the bottom portion, and the air duct first portion is integrally formed into one of the at least bottom portion and the vehicle-rearward portion of the housing;
- the airbag module further comprises an airbag module housing coupled to the housing, wherein the airbag module housing has a vehicle-rearward side, a vehicle-forward side, and a bottom side, and wherein the airbag and the inflator are disposed within the airbag module housing;
- the housing includes a housing first portion that is proximate the vehicle-forward side of the airbag module housing, a housing second portion that is proximate the bottom side of the airbag module housing, a housing third portion that is proximate the vehicle-rearward side of the airbag module housing, and a hinge integrally formed into at least the housing first portion and the housing second portion, and wherein the hinge permits a movement of the housing second portion as the inflator inflates the airbag, and wherein the movement of the housing second portion at least partially defines an opening that is proximate the airbag module housing and is configured to allow the airbag to deploy to the deployed condition;
- a first tear seam at least partially connects the second portion of the housing to the third portion of the housing, and wherein the first tear seam yields when the second portion of the housing is contacted by the airbag as the airbag deploys to the deployed condition and at least partially defines the opening;
- a second tear seam at least partially connects the first portion of the housing to the second portion of the housing, and wherein the second tear seam yields when the second portion of the housing is contacted by the airbag as the airbag deploys to the deployed condition;
- at least one aperture defined within a bottom section of the air duct, and the at least one aperture defines an at least one air vent that translates the airflow into the passenger compartment of the vehicle; and
- the housing first portion and the housing second portion include at least a portion of the air duct.

According to a second aspect of the present disclosure, an airbag assembly of a vehicle includes a support structure of the vehicle, a housing coupled to the support structure, an airbag module coupled to the housing, and an air duct at least partially integrally coupled to the housing. The support structure is within or proximate a dashboard of the vehicle. The housing includes a housing first portion, a housing second portion that is proximate the housing first portion, a housing third portion that is proximate the housing second portion, and a hinge integrally formed into at least the housing first portion and the housing second portion. The hinge permits a movement of the housing second portion, and the movement of the housing second portion at least partially defines an opening. The airbag module includes an airbag module housing coupled to the housing, an airbag deployable from an undeployed condition to a deployed condition, and an inflator disposed within the airbag module housing. The inflator is configured to inflate the airbag. Further, the air duct is configured to transmit an airflow.

Embodiments of the second aspect of the disclosure can include any one or a combination of the following features:
- the air duct includes an air duct hinge, and wherein the air duct hinge permits a movement of the air duct as the inflator inflates the airbag, and wherein the movement of the air duct at least partially defines an opening that is proximate the airbag module housing;
- a first tear seam at least partially connects the second portion of the housing to the third portion of the housing, and wherein the first tear seam yields when the second portion of the housing is contacted by the airbag as the airbag deploys to the deployed condition and at least partially defines the opening;
- a second tear seam at least partially connects the first portion of the housing to the second portion of the housing, and wherein the second tear seam yields when the second portion of the housing is contacted by the airbag as the airbag deploys to the deployed condition; and
- at least one aperture defined within a bottom portion of the air duct, and wherein the at least one aperture defines an at least one air vent that translates the airflow into the passenger compartment of the vehicle.

According to a third aspect of the present disclosure, an airbag assembly of a vehicle includes a support structure of the vehicle, a housing coupled to the support structure, an airbag module coupled to the housing, and an air duct at least partially integrally coupled to the housing. The support structure is within or proximate a dashboard of the vehicle. The airbag module further includes an airbag disposed within the housing, and an inflator disposed within the housing. The inflator is configured to inflate the airbag. The air duct is configured to transmit an airflow into a passenger compartment of the vehicle, and further includes an air duct first portion integrally formed into the housing, and an air duct second portion coupled to the air duct first portion.

Embodiments of the third aspect of the disclosure can include any one or a combination of the following features:
- an airbag cover coupled to a front portion of the housing, and wherein the airbag cover has a vehicle-rearward section and an airbag cover tear seam disposed on the vehicle-rearward section, and wherein the vehicle-rearward section and the tear seam define an airbag cover opening configured to direct a deployment of the airbag as the inflator inflates the airbag;
- the housing includes a bottom portion and a rear portion adjacent the bottom portion, and wherein the air duct first portion is integrally formed into the at least bottom portion or the rear portion of the housing; and
- a coupling member integrally formed out of the housing and that transmits the airflow from a heating ventilation and air conditioning system of the vehicle to the air duct.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5A is a side view of an airbag assembly of a vehicle, according to one example; and FIG. 5B is a side view of an airbag assembly of a vehicle having an airbag in a deployed condition, according to one example.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
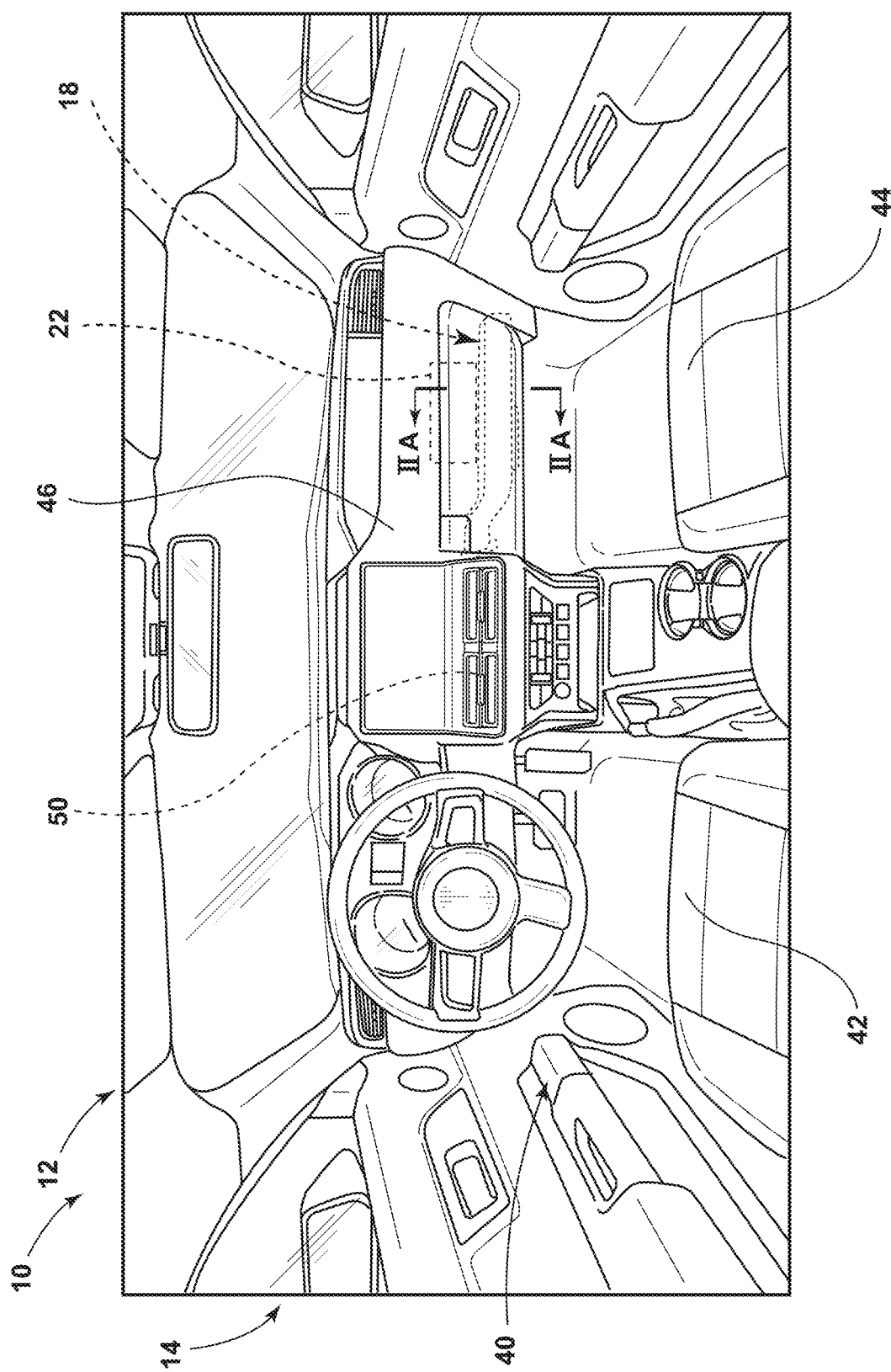
FIG. 1 is a vehicle-forward view of a passenger compartment of a vehicle having an airbag assembly, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle airbag assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5B, a vehicle interior 10 of a vehicle 12 with a passenger compartment 14 includes one or more seats such as a passenger seat, that are proximate at least one airbag assembly 18. The airbag assembly 18 includes a housing 20 coupled to a support structure 22. An airbag module 24 is coupled to the housing 20. The airbag module 24 comprises an airbag 26 disposed within the housing 20, and an inflator 28 disposed within the housing 20, wherein the inflator 28 is configured to inflate the airbag 26. An air duct 30 is at least partially integrally coupled to the housing 20 and is configured to transmit an airflow 32.

In FIG. 1, the vehicle interior 10 includes a passenger compartment 14. The passenger compartment 14 may include a first seating row 40. Fewer or more seating rows may be included in the passenger compartment 14 without departing from the teachings herein. The first seating row 40 may include a driver seat 42 and a passenger seat 44. A support structure 22, such as a dashboard 46, may be forward and proximate to the driver seat 42 and the passenger seat 44, as illustrated in FIG. 1. In some configurations, the support structure 22 may be within or proximate the dashboard 46. It is contemplated that a second seating row may include rear passenger seats. The rear passenger seats of the second seating row may include bucket seating or may be bench seating. Further, the second seating row may include an additional support structure 22 proximate the second seating row. The airbag assembly 18, as illustrated in FIG. 1, may be disposed on the support structure 22 and/or additional support structure 22 in the vehicle 12.

While the passenger compartment 14, as illustrated in FIG. 1, has the airbag assembly 18 disposed on the support structure 22 in the form of the dashboard 46 or proximate thereto and is proximate the passenger seat 44, it is contemplated that the airbag assembly 18 may be positioned in various practicable locations within the passenger compartment 14 of the vehicle interior 10 without departing from the teachings herein.

In various examples, the passenger compartment 14 is a passenger compartment that may be within the vehicle interior 10 of a sedan, a sport utility vehicle (SUV), a truck, a van, a crossover vehicle, and/or other styles of vehicles. The passenger compartment 14 may be within the vehicle interior 10 of a manually operated vehicle (e.g., with a human driver), a fully autonomous vehicle (e.g., no human driver), or a partially autonomous vehicle (e.g., may be operated with or without a human driver).

In some configurations, the vehicle 12 includes a heating, ventilation, and air conditioning (HVAC) system 50. The HVAC system 50 may include components, such as an evaporator blower assembly, a heater, a condenser, and/or a fan. The HVAC system 50 may also include at least one air duct 30 that directs an airflow 32 throughout at least a portion of the passenger compartment 14, as further discussed.

Referring to FIG. 1, the airbag assembly 18 is built into (e.g., assembled) and includes the support structure 22. In various configurations, the support structure 22 may be at least a portion of the vehicle dashboard 46. In some embodiments, the support structure 22 may be within or proximate at least a portion of the vehicle dashboard 46. In yet other configurations, the support structure 22 may be a vehicle column, at least one passenger seat of the vehicle 12, a side pillar, a headliner, and/or other various structures that may allow coupling of the housing 20, as described further herein. The support structure 22 may be any practicable size, so long as the support structure 22 allows for coupling to the housing 20 such as is shown in FIG. 2.

Referring to FIGS. 2A-5B, the airbag assembly 18 includes the housing 20, which may be connected to the support structure 22, as shown in FIG. 1. In some embodiments, the housing 20 is coupled to the support structure 22 via connectors such as fasteners. In some configurations, the housing 20 includes a first portion 60 that extends along a vehicle-forward side 94 of an airbag module housing 70, a second portion 62 that extends along a bottom side 92 of the airbag module housing 70, and a third portion 64 that extends along a vehicle-rearward side 96 of an airbag module housing 70.

Referring further to FIGS. 2A-5B, the housing 20 is configured to generally support additional components of the airbag assembly 18. The housing 20 is also configured to support the airbag module housing 70 via an at least one fastening member 72. It is generally contemplated that the housing 20 may be comprised of various materials, such as a metal, a plastic, or a composite material, so long as the housing 20 may be connected to the support structure 22 and may support additional components of the airbag assembly 18. For example, the housing 20 may be comprised of molded polyvinyl chloride (PVC) or acrylonitrile butadiene styrene (ABS), or may be machined out of a metal, such as an iron alloy or an aluminum alloy.

Figure 2A:
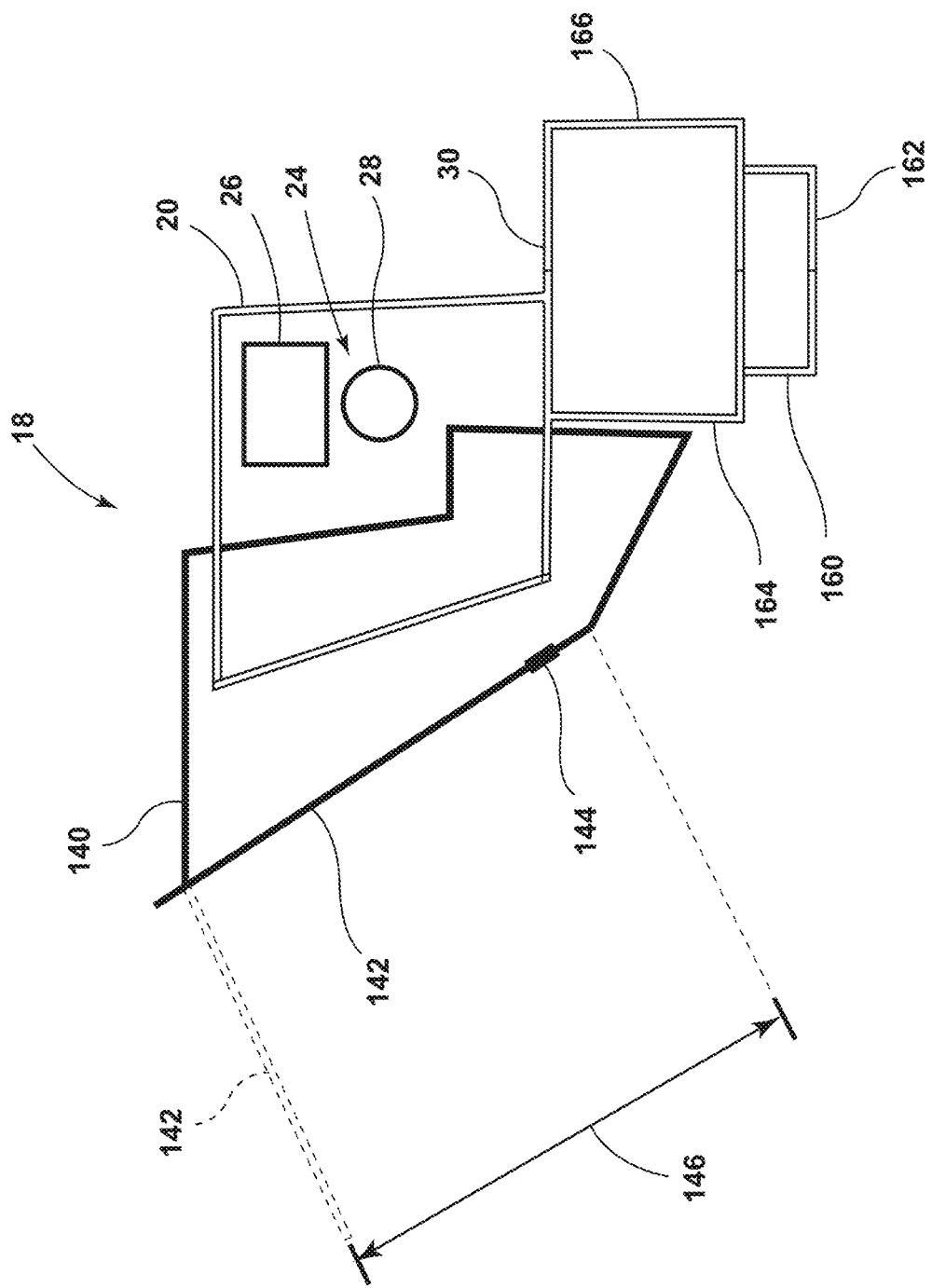
FIG. 2A is a cross-sectional view taken through line IIA-IIA of FIG. 1 illustrating the airbag assembly, according to one example.
Figure 2B:
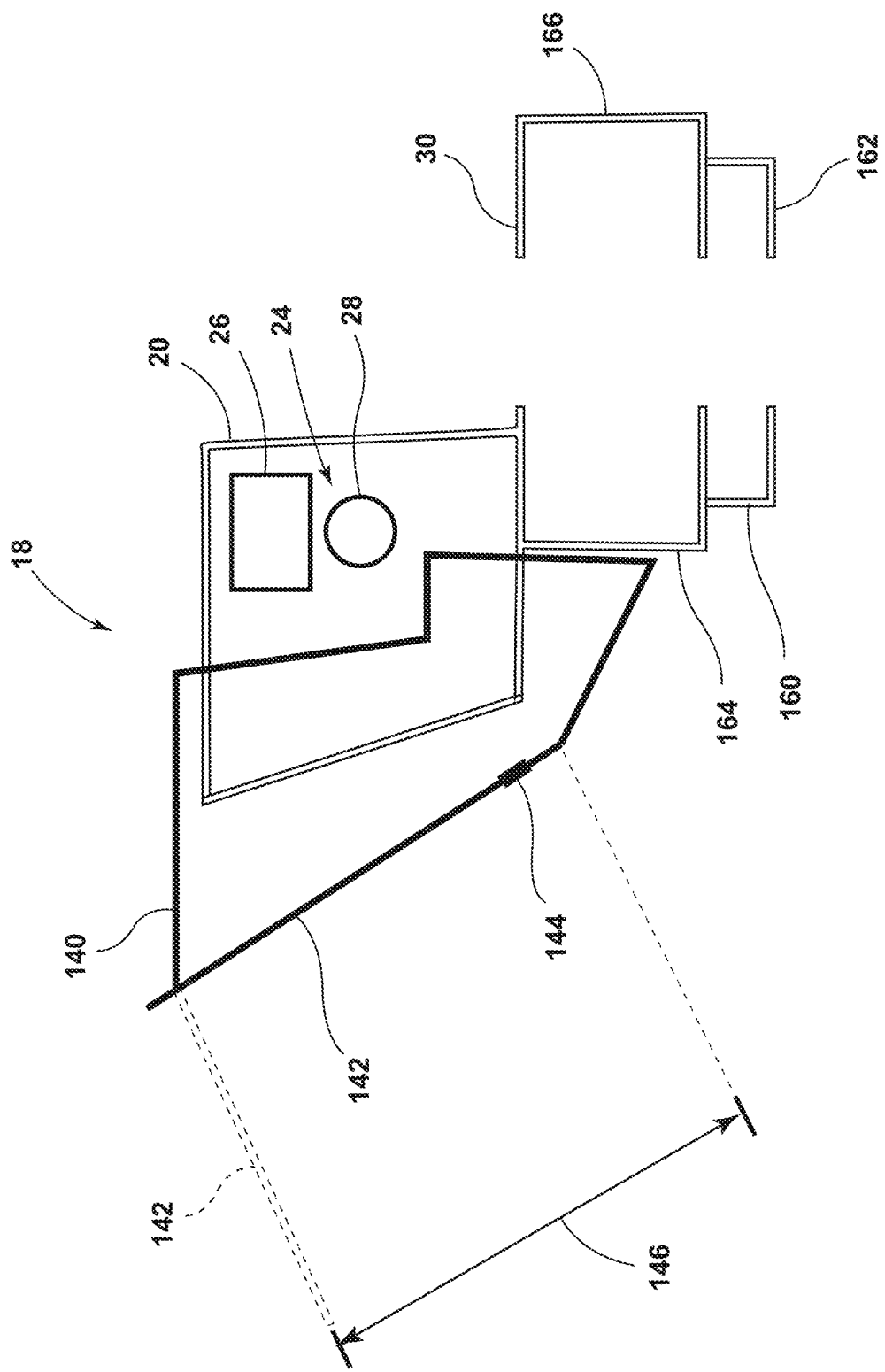
FIG. 2B is a partially exploded view of the airbag assembly, according to one example.

In the embodiment shown, the airbag assembly 18 includes an airbag module 24. In some configurations, the airbag module 24 can be coupled to and supported by the housing 20. For example, the airbag module 24 may be disposed within the housing 20, as illustrated in FIGS. 2A and 2B. The airbag module 24 may include an airbag 26 disposed within the housing 20, and an inflator 28 disposed within the housing 20. The airbag 26 is configured to deploy from an undeployed condition 80 shown in FIG. 3, to a deployed condition 82 shown in FIG. 4, when a fluid (e.g., a gas) enters the airbag 26. The inflator 28 is configured to deploy the airbag 26 from the undeployed condition 80 to the deployed condition 82 by rapidly filling the airbag 26 with the fluid.

Figure 3:
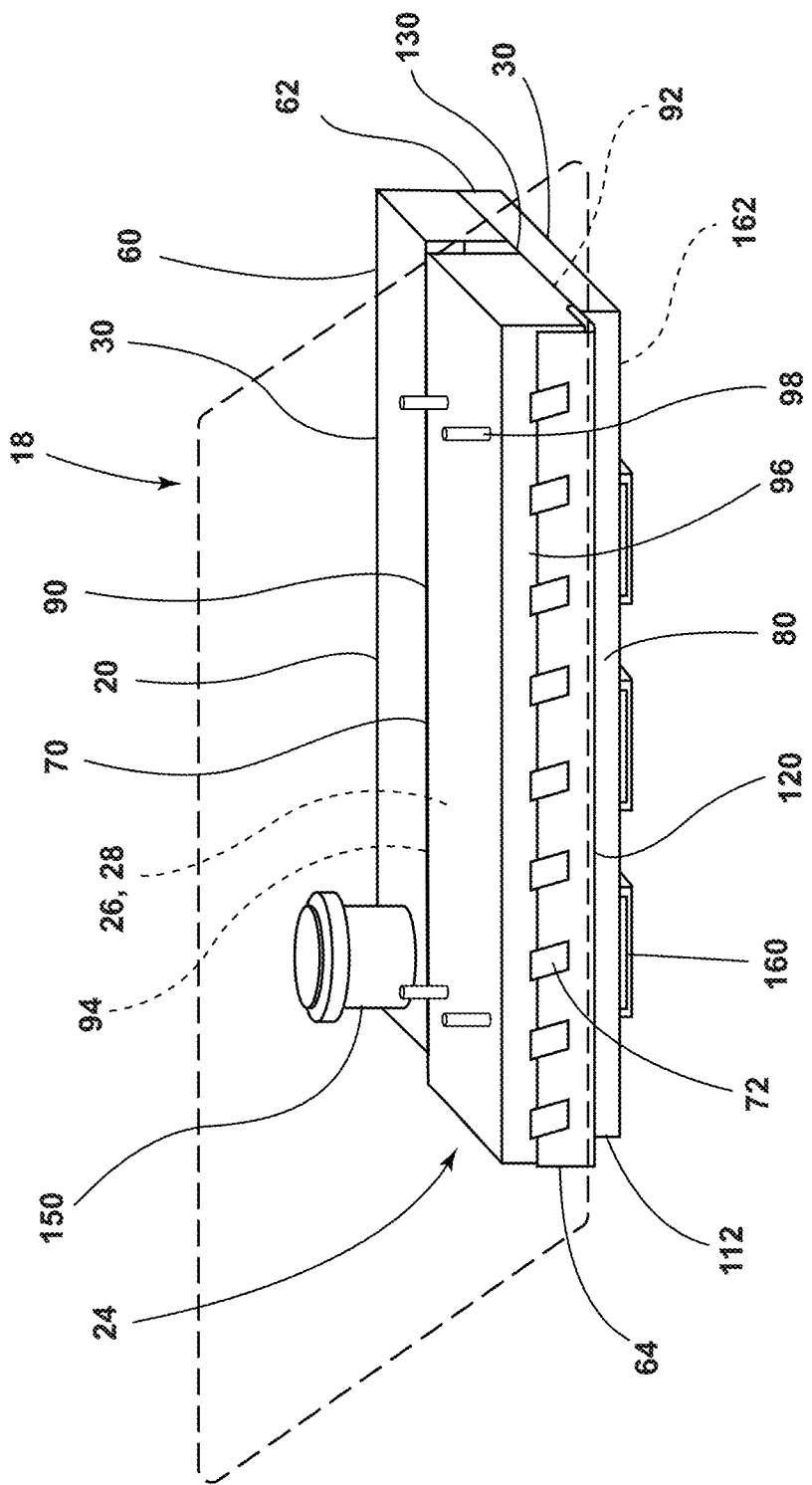
FIG. 3 is a perspective view of an airbag assembly of a vehicle, according to one example.

In yet other configurations, the airbag module 24 may include an airbag module housing 70 coupled to and supported by the housing 20, as shown in FIG. 3. The airbag module housing 70 includes a top side 90 and a bottom side 92. A vehicle-forward side 94 and a vehicle-rearward side 96 extend downward from the top side 90. In some configurations, the airbag module housing 70 may be coupled to the housing 20, such that the housing 20 supports the airbag module housing 70 via the at least one fastening member 72. In these configurations, the vehicle-forward side 94 of the airbag module housing 70 may be proximate the first portion 60 of the housing 20, the bottom side 92 of the airbag module housing 70 may be proximate the second portion 62 of the housing 20, and the vehicle-rearward side 96 of the airbag module housing 70 may be proximate the third portion 64 of the housing 20, as illustrated in FIG. 3. In these configurations, the airbag module housing 70 may be supported by the housing 20 via at least one fastening member 72. For example, the third portion 64 of the housing 20 and/or the first portion 60 of the housing 20 may couple to the vehicle-rearward side 96 and the vehicle-forward side 94 of the airbag module housing 70 via a plurality of the fastening members 72, as illustrated in FIG. 3. It is also generally contemplated that the airbag module housing 70 may include at least one support fastener 98 that may be operably coupled to the support structure 22.

Figure 4:
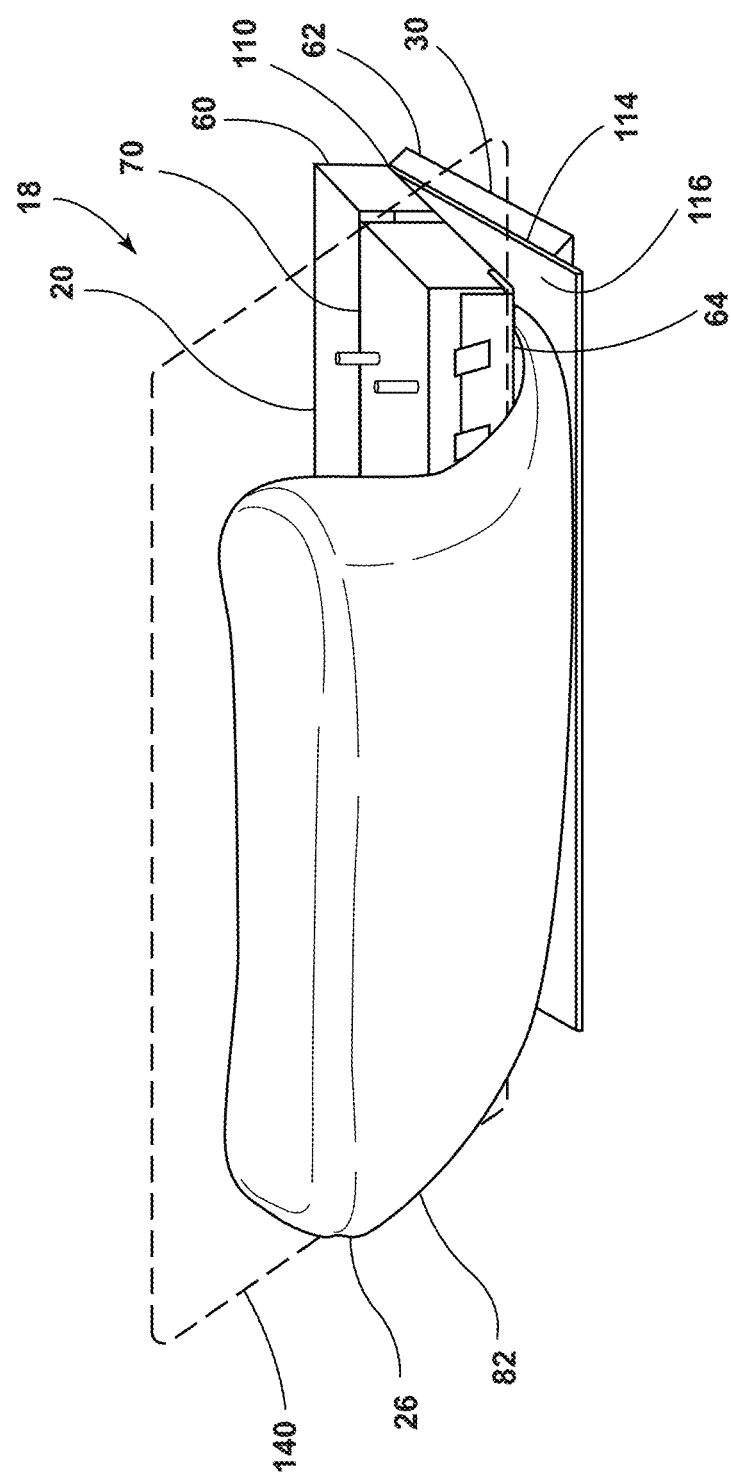
FIG. 4 is a perspective view of the airbag assembly having an airbag in a deployed condition, according to one example.

In some configurations, as illustrated in FIGS. 4-5B, in some configurations, the airbag module housing 70 may operably contain the inflator 28 and the airbag 26, and allow inflation and deployment of the airbag 26 from the undeployed condition 80 to the deployed condition 82.

Referring again to FIGS. 4 and 5B, the housing 20 may include a hinge 110. The hinge 110 may be integrally formed into at least a portion of the housing 20. For example, the hinge 110 may be integrally formed into at least the first portion 60 of the housing 20 and the second portion 62 of the housing 20. In yet other configurations, the hinge 110 may be integrally formed into at least the first portion 60 of the housing 20 and the second portion 62 of the housing 20, wherein the air duct 30 is at least partially coupled to the first portion 60 and/or the second portion 62 of the housing 20, such that the hinge 110 is an air duct hinge. The hinge 110 is configured to allow the second portion 62 of the housing 20 to pivot outwards from a first position 112 to a second position 114, wherein the second position 114 at least partially defines an opening 116. For example, the hinge 110 may be a living hinge that deforms when the second portion 62 of the housing 20 is contacted by the airbag 26 during deployment, such that the living hinge 110 deforms and the second portion 62 of the housing 20 pivots outward from the first position 112 to the second position 114, as illustrated in FIGS. 3-5B. It is generally contemplated that the hinge 110 may be formed of various materials, such as a plastic or a metal, so long as the hinge 110 may allow the second portion 62 of the housing 20 to pivot from the first position 112 to the second position 114. In some configurations, the second portion 62 of the housing 20 may be at least a portion of the air duct 30 and the at least a portion of the air duct 30 may pivot outward from the first position 112 to the second position 114.

A section of the housing 20 with a reduced thickness may define a first tear seam 120. Additionally or alternatively, a section of the housing 20 with a perforation and/or comprised of a differing material may define the first tear seam 120. In some configurations, the first tear seam 120 may connect the second portion 62 of the housing 20 to the third portion 64 of the housing 20. In operation, the first tear seam 120 yields and permits movement of the second portion 62 of the housing 20 as the inflator 28 inflates the airbag 26 from the undeployed condition 80 to the deployed condition 82. As the first tear seam 120 yields, the movement of the second portion 62 of the housing 20 from the first position 112 to the second position 114 is at least partially permitted, and subsequently the opening 116 is at least partially defined proximate the airbag module housing 70.

A section of the housing 20 with a reduced thickness may define a second tear seam 130, as illustrated in FIGS. 3 and 5A. Additionally or alternatively, a section of the housing 20 with a perforation and/or comprised of a differing material may define the second tear seam 130. In some configurations, the second tear seam 130 may connect the first portion 60 of the housing 20 to the second portion 62 of the housing 20, as illustrated in FIG. 3. In operation, the second tear seam 130 yields and permits movement of the second portion 62 of the housing 20 as the inflator 28 inflates the airbag 26 from the undeployed condition 80 to the deployed condition 82. As the second tear seam 130 yields, the movement of the second portion 62 of the housing 20 from the first position 112 to the second position 114 is at least partially permitted, and subsequently the opening 116 is at least partially defined proximate the airbag module housing 70.

Referring to FIGS. 2A-5B, the airbag assembly 18 may include an airbag cover 140. In some configurations, the airbag cover 140 may be vehicle-rearward of the housing 20. The airbag cover 140 may include a vehicle-rearward section 142 and an airbag cover tear seam 144 disposed on the vehicle-rearward section 142. The airbag cover tear seam 144 is configured to yield in response to a contact with the airbag 26 and define an airbag cover opening 146, wherein the airbag 26 deploys out of the airbag cover opening 146.

The airbag assembly 18 includes the air duct 30 integrated therewith. In some configurations, the air duct 30 may be at least partially coupled to the housing 20. For example, the air duct 30 may be coupled to a portion of the housing 20. It is generally contemplated that the air duct 30 may be at least partially integrally coupled to various locations of the housing 20, such as a bottom portion and/or a vehicle-rearward portion of the housing 20. For example, the housing 20 and air duct 30 may be molded out of polyvinyl chloride, and the air duct 30 may be proximate a vehicle-rearward portion of the housing 20, as illustrated in FIGS. 2A, 2B and 5A. In yet other configurations, the air duct 30 may be at least partially defined within the housing 20. Further, it is generally contemplated that the air duct 30 may be integrally formed out of an airbag cover 140 and may be proximate the housing 20.

Referring to FIGS. 5A and 5B, the air duct 30 is configured to translate the airflow 32 generated from the HVAC system 50 of the vehicle, and to subsequently dissipate or exhaust the airflow 32 into the passenger compartment 14 of the vehicle 12. The air duct 30 may include a coupling member 150. The coupling member 150 may be integrally coupled to the housing 20 and may extend generally outward from the housing 20. For example, the coupling member 150 may be integrally coupled to the housing 20 and may extend generally outward from the housing 20 in a vehicle-upward direction, as illustrated in FIG. 3. The coupling member 150 is configured to translate an airflow 32 from the HVAC system 50 to the air duct 30.

The air duct 30 may include at least one aperture that defines an air vent 160. In some configurations, the air vent 160 may be defined on a bottom section 162 of the air duct 30. In yet other configurations, the air vent 160 may be defined on a bottom section 162 of an air duct first portion 164 and/or a bottom section 162 of an air duct second portion 166, as further discussed. The air vent 160 is configured to allow the airflow 32 to expel into the passenger compartment 14 of the vehicle 12 from the air duct 30. It is generally contemplated that the air vent 160 may be defined in various positions throughout the air duct 30, so long as the air vent 160 is capable of allowing the airflow 32 to expel into the passenger compartment 14 of the vehicle 12. It is also generally contemplated that the air duct 30 may define a plurality of air vents 160. For example, the air duct 30 may define a plurality of air vents 160 along a bottom section 162 of the air duct 30, such that the airflow 32 may expel into the passenger compartment 14 from the air duct 30.

With particular reference to FIGS. 2A and 2B, the air duct 30 may include an air duct first portion 164 and an air duct second portion 166 coupled to the air duct first portion 164 that together at least partially define the air duct 30. In some configurations, the air duct first portion 164 and/or air duct second portion 166 may be integrally formed out of the housing 20. For example, as illustrated in FIGS. 2A and 2B, the air duct first portion 164 may be integrally formed out of the housing 20, and the air duct second portion 166 may be coupled to the air duct first portion 164 via a weld and/or a plurality of fasteners. In yet other configurations, the air duct first portion 164 and/or air duct second portion 166 may be integrally formed out of the airbag cover 140. For example, the airbag cover 140 and the air duct first portion 164 may be both integrally formed out of a plastic, such that the air duct first portion 164 is proximate the airbag cover 140. It is generally contemplated that the air duct first portion 164 and/or the air duct second portion 166 may be at least partially integrally formed out of the housing 20 and/or the airbag cover 140, so long as the air duct first portion 164 and the air duct second portion 166 may at least partially define the air duct 30.

In operation of an exemplary embodiment, initially, the vehicle 12 is in a standard use condition. In the standard use condition, the airflow 32 is conveyed from the HVAC system 50, through the air duct 30 that is integrally coupled to the housing 20 and subsequently into the passenger compartment 14, and the airbag 26 is in the undeployed condition 80. Next, the airbag 26 deploys from the undeployed condition 80 to the deployed condition 82. As the airbag 26 deploys, the first and second tear seams 120, 130 of the housing 20 yield due to contact from the airbag 26. In doing so, the second portion 62 of the housing 20 detaches from the third portion 64 of the housing 20 and partially detaches from the first portion 60 of the housing 20, such that the second portion 62 of the housing 20 is free to pivot about the hinge 110 from the first position 112 to the second position 114, as illustrated in FIG. 4. In the second position 114 of the second portion 62, the opening 116 is defined, and the airbag 26 deploys out of the opening 116.

The airbag assembly 18 of the present disclosure may provide for a variety of advantages. First, the air duct 30 being integrally coupled to the housing 20 reduces the footprint within the vehicle interior 10, as compared to a vehicle 12 where an air duct 30 is not integrally coupled to a housing 20. Second, the air duct 30 being integrally coupled to the housing 20 reduces the number of components, which may improve manufacturing efficiencies of the vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An airbag assembly of a vehicle, comprising:
    a support structure of the vehicle;
    a housing coupled to the support structure;
        an airbag module coupled to and supported by the housing, wherein the airbag module further comprises:
            an airbag deployable from an undeployed condition to a deployed condition; and
            an inflator configured to inflate the airbag from the undeployed condition to the deployed condition; and
        an airbag module housing coupled to the housing, wherein the airbag module housing has a vehicle-rearward side, a vehicle-forward side, and a bottom side, and wherein the airbag and the inflator are disposed within the airbag module housing, and wherein the housing comprises a housing first portion proximate the vehicle-forward side of the airbag module housing, a housing second portion proximate the bottom side of the airbag module housing, and a housing third portion proximate the vehicle-rearward side of the airbag module housing;
        a hinge integrally formed into at least the housing first portion and the housing second portion, wherein the hinge permits a movement of the housing second portion as the inflator inflates the airbag, and wherein the movement of the housing second portion at least partially defines an opening that is proximate the airbag module housing and is configured to allow the airbag to deploy to the deployed position; and
        an air duct coupled to the housing, wherein the air duct is configured to transmit an airflow.

2. The airbag assembly of claim 1, wherein the support structure is within or proximate at least a portion of a dashboard of the vehicle.

3. The airbag assembly of claim 1, wherein the air duct further comprises:
    an air duct first portion integrally coupled to the housing; and
    an air duct second portion coupled to the air duct first portion.

4. The airbag assembly of claim 3, further comprising an airbag cover vehicle-rearward of the housing, wherein the airbag cover has a vehicle-rearward section and a tear seam disposed on the vehicle-rearward section, and wherein the vehicle-rearward section and the tear seam define an airbag cover opening configured to direct a deployment of the airbag as the inflator inflates the airbag.

5. The airbag assembly of claim 4, wherein the housing includes a bottom portion and a vehicle-rearward portion adjacent the bottom portion, and wherein the air duct first portion is integrally formed into one of the at least bottom portion and the vehicle-rearward portion of the housing.

6. The airbag assembly of claim 1, wherein a first tear seam at least partially connects the second portion of the housing to the third portion of the housing, and wherein the first tear seam yields when the second portion of the housing is contacted by the airbag as the airbag deploys to the deployed condition and at least partially defines the opening.

7. The airbag assembly of claim 6, wherein a second tear seam at least partially connects the first portion of the housing to the second portion of the housing, and wherein the second tear seam yields when the second portion of the housing is contacted by the airbag as the airbag deploys to the deployed condition.

8. The airbag assembly of claim 7, further comprising an at least one aperture defined within a bottom section of the air duct, and wherein the at least one aperture defines an at least one air vent that translates the airflow into a passenger compartment of the vehicle.

9. The airbag assembly of claim 1, wherein the housing first portion and the housing second portion include at least a portion of the air duct.

10. An airbag assembly of a vehicle, comprising:
    a support structure of the vehicle, wherein the support structure is within or proximate a dashboard of the vehicle;
    a housing coupled to the support structure and comprising:

a housing first portion;
a housing second portion that is proximate the housing first portion;
a housing third portion that is proximate the housing second portion; and
a hinge integrally formed into at least the housing first portion and the housing second portion, and wherein the hinge permits a movement of the housing second portion, and wherein the movement of the housing second portion at least partially defines an opening;
an airbag module coupled to the housing and comprising:
an airbag module housing coupled to the housing;
an airbag deployable from an undeployed condition to a deployed condition; and
an inflator disposed within the airbag module housing, wherein the inflator is configured to inflate the airbag; and
an air duct coupled to the housing, wherein the air duct is configured to transmit an airflow.

11. The airbag assembly of claim 10, wherein the air duct includes an air duct hinge, and wherein the air duct hinge permits a movement of the air duct as the inflator inflates the airbag, and wherein the movement of the air duct at least partially defines an opening that is proximate the airbag module housing.

12. The airbag assembly of claim 10, wherein a first tear seam at least partially connects the second portion of the housing to the third portion of the housing, and wherein the first tear seam yields when the second portion of the housing is contacted by the airbag as the airbag deploys to the deployed condition and at least partially defines the opening.

13. The airbag assembly of claim 12, wherein a second tear seam at least partially connects the first portion of the housing to the second portion of the housing, and wherein the second tear seam yields when the second portion of the housing is contacted by the airbag as the airbag deploys to the deployed condition.

14. The airbag assembly of claim 10, further comprising at least one aperture defined within a bottom portion of the air duct, and wherein the at least one aperture defines at least one air vent that translates the airflow into a passenger compartment of the vehicle.

15. An airbag assembly of a vehicle, comprising:
a support structure of the vehicle, wherein the support structure is within or proximate to a dashboard of the vehicle;
a housing coupled to the support structure and comprising:
a housing first portion;
a housing second portion that is proximate the housing first portion;
a housing third portion that is proximate the housing second portion; and
a hinge integrally formed into at least the housing first portion and the housing second portion, wherein the hinge permits a movement of the housing second portion, and wherein the movement of the housing second portion at least partially defines an opening;
an airbag module coupled to the housing, wherein the airbag module further comprises:
an airbag disposed within an airbag module housing that is coupled to the housing; and
an inflator disposed within the airbag module housing, wherein the inflator is configured to inflate the airbag; and
an air duct coupled to the housing, wherein the air duct is configured to transmit an airflow into a passenger compartment of the vehicle, and wherein the air duct further comprises:
an air duct first portion integrally formed into the housing; and
an air duct second portion coupled to the air duct first portion.

16. The airbag assembly of claim 15, further comprising an airbag cover coupled to a front portion of the housing, and wherein the airbag cover has a vehicle-rearward section and an airbag cover tear seam disposed on the vehicle-rearward section, and wherein the vehicle-rearward section and the tear seam define an airbag cover opening configured to direct a deployment of the airbag as the inflator inflates the airbag.

17. The airbag assembly of claim 15, wherein the housing includes a bottom portion and a vehicle-rearward portion adjacent the bottom portion, and wherein the air duct first portion is integrally formed into the at least bottom portion or the vehicle-rearward portion of the housing.

18. The airbag assembly of claim 15, further comprising a coupling member integrally formed out of the housing and that transmits the airflow from a heating ventilation and air conditioning system of the vehicle to the air duct.

* * * * *